(12) United States Patent
Hagny

(10) Patent No.: US 8,499,703 B2
(45) Date of Patent: Aug. 6, 2013

(54) SEED TUBE MOUNTING ASSEMBLY FOR AGRICULTURAL SEEDER

(76) Inventor: Matthew P. Hagny, Bel Aire, KS (US)

( * ) Notice: Subject to any disclaimer, the term of this patent is extended or adjusted under 35 U.S.C. 154(b) by 300 days.

(21) Appl. No.: 12/963,389

(22) Filed: Dec. 8, 2010

(65) Prior Publication Data

US 2012/0145057 A1 Jun. 14, 2012

(51) Int. Cl.
*A01C 23/00* (2006.01)
(52) U.S. Cl.
USPC .......................... 111/121; 111/163; 111/167
(58) Field of Classification Search
USPC .............. 111/121, 163, 170, 171, 174, 200, 111/140
See application file for complete search history.

(56) References Cited

U.S. PATENT DOCUMENTS

| | | | |
|---|---|---|---|
| 713,616 A | 11/1902 | Dobbin | |
| 1,056,386 A | 3/1913 | Wheeler | |
| 1,764,218 A * | 6/1930 | Mayfield | 111/167 |
| 2,764,111 A * | 9/1956 | Collins | 111/70 |
| 2,808,792 A * | 10/1957 | Brickman | 111/186 |
| 2,869,489 A | 1/1959 | Buhr | |
| 2,917,012 A | 12/1959 | Oehler et al. | |
| 2,920,587 A | 1/1960 | Shriver | |
| 4,031,834 A | 6/1977 | Klenke | |
| 4,196,679 A | 4/1980 | Moore | |
| 4,218,028 A | 8/1980 | Pickens | |
| 4,760,806 A | 8/1988 | Bigbee et al. | |
| 4,915,258 A | 4/1990 | Olson | |
| 5,092,255 A | 3/1992 | Long et al. | |
| 5,522,328 A | 6/1996 | Long | |
| 5,533,458 A | 7/1996 | Bergland et al. | |
| 5,542,363 A | 8/1996 | Gamino | |
| 5,595,130 A | 1/1997 | Baugher et al. | |
| 5,664,507 A | 9/1997 | Bergland et al. | |
| 5,802,995 A | 9/1998 | Baugher et al. | |
| 5,931,105 A | 8/1999 | Luxon | |
| 5,974,988 A | 11/1999 | Stufflebeam et al. | |
| 6,029,591 A | 2/2000 | Baugher et al. | |
| 6,237,696 B1 | 5/2001 | Mayerle | |
| 6,332,413 B1 | 12/2001 | Stufflebeanm et al. | |
| 6,347,594 B1 | 2/2002 | Wendling et al. | |
| 6,386,127 B1 | 5/2002 | Prairie et al. | |
| 6,935,253 B2 * | 8/2005 | Murray et al. | 111/135 |
| 7,152,540 B1 | 12/2006 | Sauder et al. | |
| 7,168,376 B2 | 1/2007 | Johnston | |
| 7,263,937 B2 | 9/2007 | Frasier | |
| 7,426,894 B2 | 9/2008 | Peterson et al. | |
| 7,472,660 B2 | 1/2009 | Mariman et al. | |
| 7,497,174 B2 | 3/2009 | Sauder et al. | |

(Continued)

*Primary Examiner* — Alicia Torres
(74) *Attorney, Agent, or Firm* — Jeffrey L. Thompson; Thompson & Thompson, P.A.

(57) ABSTRACT

An opener assembly for an agricultural seeder has an opener disc attached to an opener subframe. The opener disc is angled to the direction of travel to create a furrow for depositing seeds. A boot is mounted to the opener subframe beside the opener disc for preventing loose soil from falling into the furrow ahead of seed deposited therein. A seed tube is mounted to the opener subframe by a two-part bracket. The bracket includes a first part attached to the opener subframe and a second part fixed to the seed tube. The first part has a channel structure for receiving and partially surrounding the seed tube, and a pair of slots formed in sidewalls of the channel structure. The second part has an L-shaped structure with a portion that mates with the pair of slots. A key ring mechanism is used to lock the first and second parts together.

21 Claims, 4 Drawing Sheets

(56) References Cited

U.S. PATENT DOCUMENTS

| | | | |
|---|---|---|---|
| 7,568,438 B2* | 8/2009 | Arksey | 111/121 |
| 7,584,707 B2 | 9/2009 | Sauder et al. | |
| 7,856,934 B2* | 12/2010 | Hagny | 111/163 |
| 2003/0085326 A1 | 5/2003 | Simonson et al. | |
| 2009/0013910 A1 | 1/2009 | Sheppard et al. | |
| 2009/0158979 A1 | 6/2009 | Sauder et al. | |
| 2009/0308296 A1 | 12/2009 | Senchuk | |

* cited by examiner

SEED TUBE MOUNTING ASSEMBLY FOR AGRICULTURAL SEEDER

RELATED APPLICATIONS

This application relates to the subject matter of Applicant's pending U.S. patent application Ser. No. 12/402,972 filed on Mar. 12, 2009. The entire content of this prior application is hereby incorporated by reference.

BACKGROUND OF THE INVENTION

1. Field of the Invention

The present invention relates generally to agricultural seeders that make furrows in the soil into which seeds are placed, and more particularly, to an improved seed tube mounting assembly for use with such seeders.

2. Description of the Related Art

Agricultural planting methods continue to advance in response to widespread adoption of "no-till" or "reduced-till" crop production techniques with greatly reduced dependence on tillage of the soil, and in which the next crop's seeds are often placed directly into the previous crop's stubble or crop residues. No-till or reduced-till seeding differs greatly from seeding into a tilled seedbed. Although the soil conditions for no-till seeding are typically characterized by more structural stability than tilled soils, as the soil particles are "aggregated" or held together by old roots, fungi, and other organic substances and molecular attractions binding the particles together, it is still of considerable importance to prevent loose soil and "duff" (chaff and small pieces of partially decomposed mulch) from entering the seed furrow prematurely, before the seeds have come to rest at the bottom of the furrow. This is of particular importance on single-disc opener designs which are particularly vulnerable to loose soil and duff sloughing into the furrow after the opener disc has passed, relying on soil stability and/or a seed boot to inhibit the loose soil and duff from entering the furrow until after the seeds have been adequately placed in the bottom of the cut furrow.

Single-disc opener designs for seed or fertilizer placement have met with considerable success in no-till seeding, partly due to simplicity. Because of the structural stability of no-till soils, much higher down-force requirements are imposed on the opener disc to cut the furrow to a consistent depth. This additional strain generally necessitates more robust opener discs together with a much larger hub and mechanical bearing(s) on which the opener discs are rotatably mounted, and this durability requirement also lends an advantage to the single-disc design for cost and space constraints. Larger hubs and bearings on the opener discs can interfere with the routing of seed-delivery tubes and positioning of gauge wheels.

Gauge wheels pose a design problem because the most desirable positioning is with the gauge wheel contacting the soil most forcefully at the point where the opener disc's rearward edge is rotating up out of the soil. This allows the gauge wheel to control "sidewall blowout," which results from the opener disc's upward rotation and angle to the direction of travel causing the furrow sidewall to tear apart and lift upward, i.e., following the disc's rotation upward as it exits the furrow. When left unchecked, sidewall blowout sometimes results in the furrow sidewall tearing completely free and being flung out of the furrow by the opener disc's momentum, thereby creating an irregularly shaped furrow and/or allowing pieces of the sidewall to enter the furrow before seeds have been properly placed.

The opener disc is typically mounted at a slight angle to the direction of travel so that it is pushing soil laterally to create a furrow. For controlling sidewall blowout, gauge wheels generally are mounted in the same plane as the opener discs, with the inner lip of the gauge wheel flush against the outer edge of the opener disc ("outer" refers to the side away from the furrow being cut). With a 16-inch or 18-inch diameter opener disc (the preferred disc sizes due to optimal cutting ability at 1.5- to 2-inch seeding depth; larger sizes hairpin more mulch, and smaller sizes are more prone to plugging or "bulldozing" of clumps of straw or debris), and a 15-inch gauge wheel (again, the preferred size, since smaller sizes resist rolling over small obstacles in the field, and larger sizes get in the way of other components), the forward edge of the gauge wheel is then approximately at the axis of the opener disc, which prevents the opener disc's hub from being located on the outside of the opener disc, especially if it is a large heavy-duty hub ("outside" refers to the side away from the furrow being formed). Hence, a double-disc design has somewhat limited options as to where to locate relatively large hubs, since the opener discs must be at a narrow angle to each other to cut the soil properly, with such relationship physically precluding large hubs from being between the discs. On the single-disc design, the large hubs are typically located on the opposite side of the opener disc from the gauge wheel, which is the inside of the opener disc.

With a large hub on the inside of the opener disc, the seed delivery tube must pass either ahead of the hub or behind it. If the seed tube passes in front of the hub, the trajectory of the seeds passing inside the tube will be approximately at a 45-degree angle to the furrow (in the horizontal plane of the soil when on level terrain), aimed rearward as much as downward, due to the need for the seeds to enter the furrow when it has appreciable width, which would be directly below the hub and rearward of it. The rearward seed trajectory poses a significant problem of ricochet, which is the tendency of the seeds to bounce upward and out of the furrow after striking the soil or the opener disc after the seeds exit the seed-directing tube and/or boot. While a significant problem for grain drills with gravity-fed seed delivery, this problem is greatly exacerbated by forced-air delivery which has become commonplace on larger width drills called "air drills." The seeds are carried in an air stream and move at a velocity greater than that attained by seeds falling solely under the influence of gravity, thereby increasing the ricochet effect. Further, if no provision is made for the pressure of the air stream to be vented or diffused to the ambient atmosphere until the seeds exit the lower end of the seed tube or boot, the air stream itself can carry lighter seeds out of the furrow as the air stream blasts into the furrow and then out of the furrow as it escapes.

A single-disc no-till drill opener design that has met with great success in the marketplace is typified by the John Deere drill models 1590 and 1890, and their predecessor models 1560 and 1860 (hereinafter "Deere 60- and 90-series"), both of which are slightly updated versions of the basic opener design described in U.S. Pat. No. 4,760,806 issued to Bigbee, which was first embodied in John Deere drill models 750 and 1850 (hereinafter "Deere 50-series"). On the Deere 60- and 90-series openers, as well as the 50-series, the seed boot is held directly on the opener subframe via a single bolt, with the boot being able to pivot on the bolt's axis by a few degrees. The boot is urged toward the opener disc by a leaf spring secured in a recess below the bolt, which continually holds one side of the boot's forward/lower edge flush against the opener disc. The seed tube passes forward of the disc's hub and enters the top of the boot near the aforementioned bolt attachment point which is also ahead of the hub. The seed tube is formed of steel pipe, being insertable inside a channel cast in the seed boot, with a threaded stud retaining bolt being located perpendicular to the axis of the tube and fitting into holes provisioned in the boot and tube. This stud bolt is difficult to align with the tube hole during (re)installation, and protrudes into the seed flow area inside the pipe, thereby becoming a primary cause of tube and boot plugging on the Deere 50-, 60-, and 90-series openers. Due to corrosion from moisture, and dust from seed treatments and prilled fertilizers passing inside the tube, these stud bolts often become extremely difficult to remove after a year or more. Further, because the various seed tubes on the various Deere 50-, 60-, and 90-series drill models all have bends along their length to circumnavigate the hub and other components, and/or to join the boot, the debris and obstructions which from time to time accumulate inside the tube are often difficult to dislodge. Arc curvature of the internal channel in the cast seed boot creates similar problems. Furthermore, the internal channel of the boot on these drill models is inclined about 45 degrees from vertical during field operation, which is far less conducive to seed and fertilizer flow than is a more vertical and less convoluted route into the soil. At the end of a seeding pass, or for transport, the opener assemblies are rotated (via a rockshaft torqued hydraulically) upward at the rear, which causes the internal channel of the seed boot to become more nearly horizontal yet. This generally results in fertilizer and/or seed settling into the boot channel and again adds propensity to clog the boot and tube, especially since both seed and fertilizer draw moisture from the air if the drill is parked overnight or during a rainy spell.

Other single-disc drill designs have routed the seed tube behind the opener disc's hub, resulting in the seed tube being more nearly vertical, and possibly angled slightly forward at the lower end. The more vertical orientation results in less seed ricochet, although it is quite important that the tube not be too far rearward in relation to the opener disc because of reduced control over seed placement, and it is also important that a boot and seed bounce flap adequately direct the seeds into the bottom of the furrow. This seed tube arrangement was integrated into a single-disc no-till opener that was marketed for several years (now discontinued) as Flexi-coil's "FSO" or "F/SO," and is depicted in U.S. Pat. No. 6,237,696 B1 issued to Mayerle. The shape and location of the Mayerle '696 boot and tube allow much greater precision in placing seeds at the bottom of the seed furrow as compared to the Deere 60- and 90-series. The FSO model attached the boot ("scraper plate") to the seed tube via two adjustable bolts that pinched a rubberized pad, with these components being oriented such that tightening a specific bolt would typically align the front edge of the boot against the opener disc. However, in field conditions, this configuration was generally more troublesome than the Deere 50-, 60-, and 90-series with their 'automatic' spring-loaded tension to constantly and continuously align the boot with the opener disc. On the FSO, the tube itself was attached directly to the opener subframe via two cap-screw studs, thus there was no provision for rapid removal of the tube in the field, nor in quickly separating the tube from the boot for clearing of obstructions in either.

Baugher et al., U.S. Pat. Nos. 5,595,130, 5,802,995, and 6,029,591, depict a single-disc opener with a tube passing rearward of the opener disc's hub, with the boot ("runner") attached directly to the tube. The various seed tubes depicted in Baugher '130, '995, and '591 are fully integrated with and rigidly affixed to the "runner" or "shoe" (a.k.a. boot) depicted and described therein, with the entire boot and tube assembly being attached to the opener subframe at a forwardly located point. In all three Baugher patents, the entire boot and tube assembly pivots a few degrees along the axis of a single attaching bolt or pin at the forward end of the assembly, and is biased toward the opener disc with a spring device. In the '995 and '130 patents, the boot pivots about an axis that is mostly horizontal (with its axis along the direction of travel), while in the '591 patent it pivots about an axis that is nearly vertical. While the Baugher '130, '995, and '591 patents retain most of the other functional elements of the Deere 50-, 60-, and 90-series opener, the seed boots and tubes depicted therein involve substantial revision of the opener subframe design to accommodate the boot and tube; i.e., the boots and tubes depicted in these patents wouldn't fit existing Deere 50-, 60-, and 90-series openers, nor would any alterations allow the boots and tubes to fit those openers without a substantial rebuilding of the opener subframe. The Baugher '130, '995, and '591 patents also depict a seed tube which is still oriented somewhat rearward and not forward at its lower end, and also with the lower end of the tube located more rearward of the opener disc's axis than is desirable since the disc is useful in holding the soil and duff out of the furrow while seeds are being placed, and this occurs to the greatest extent where the opener disc is at the bottom of the furrow (i.e., directly below the disc axis).

Yet another type of seed boot for single-disc drill openers is described in Wendling et al., U.S. Pat. No. 6,347,594 B1, with a substantially vertical seed tube passing rearward of the opener disc's hub. The seed tube is attached rigidly to a narrow boot via two bolts, which again prevents rapid disassembly for inspection or maintenance. This tube and boot assembly attaches to the opener subframe via a bolt which allows the entire tube and boot assembly to pivot a few degrees on the bolt along a horizontal axis (approximately along the direction of travel, and parallel to the plane of the opener disc). The boot and tube assembly is biased toward the opener disc via a leaf spring.

There is a need for an improved seed tube mounting assembly for use with agricultural seeders.

SUMMARY OF THE INVENTION

An object of the present invention is to provide an improved seed tube mounting assembly that overcomes the problems associated with the conventional seed tube mounting arrangements used with opener assemblies of no-till seeders.

A further object of the present invention is to provide a seed tube mounting assembly for an agricultural seeder that allows the seed tube to be mounted in a nearly vertical orientation to facilitate uniform seed drop through the seed tube, more precise placement of seeds in the planted furrow, and less likelihood of seed tube blockages from clumps of seed or dry fertilizer. In furtherance of precise seed placement, the tube may be aimed forwardly at its lower end, and, for air drills, the air pressure from the supply lines can be vented in the upwardly open area formed by the upper portion of the boot into which the seed tube channels the seed.

A further object of the present invention is to provide a seed tube mounting assembly that holds the seed tube rigidly and securely in place on the opener subframe, while allowing simple and efficient removal and replacement of the seed tube when needed.

A further object of the present invention is to provide a seed tube mounting arrangement in which the tube is rigidly or nearly rigidly held in place so that the seed trajectory is always aimed into the furrow, even if the boot itself has lost tension against the opener disc or if the boot has become lost entirely.

A further object of the present invention is to provide a seed tube mounting assembly that utilizes an existing attachment point on the opener subframe, namely the closing wheel arm attachment bolt, to secure the seed tube to the opener subframe.

To achieve these and other objects of the present invention, an opener assembly having an improved seed tube mounting assembly for use with agricultural seeders is described herein. The opener assembly includes an opener disc attached to an opener subframe. The opener disc is angled slightly to the direction of travel to create a furrow for depositing seeds. A boot is mounted to the opener subframe beside the opener disc for preventing loose soil from falling into the furrow ahead of seed being deposited therein. A seed tube is mounted to the opener subframe by a two-part bracket. The bracket includes a first part attached to the opener subframe and a second part fixed to the seed tube. The first part has a channel structure for receiving and partially surrounding the seed tube, and a pair of slots formed in sidewalls of the channel structure. The second part has an L-shaped structure with a portion that mates with the pair of slots. A key ring mechanism is used to lock the first and second parts of the mounting bracket together.

According to one aspect of the present invention, an opener assembly for an agricultural seeder is provided, comprising: an opener subframe; an opener disc attached to the opener subframe for rotation about an axis, the opener disc being arranged for forming a furrow in the ground; a seed tube arranged for guiding seeds into the furrow; a closing wheel arm connected to the opener subframe by a pivot structure comprising a threaded bolt and inner sleeve rotating on outer bushings held by a socket in the subframe; and a mounting bracket for securing the seed tube to the opener subframe, the bracket comprising a first mounting part attached to the opener subframe via the threaded bolt and a second mounting part fixed to the seed tube. The first and second mounting parts have portions that mate together with each other to removably secure the seed tube to the opener subframe.

According to another aspect of the present invention, the first mounting part has first and second sidewalls extending from a base wall to form a channel having an open side for receiving the seed tube, and the sidewalls have first and second slots, respectively, that are open at their top sides. The second mounting part has a first portion that fits into the first slot, and a second portion that fits into the second slot. The first and second portions of the second mounting part mate with the first and second slots, respectively, to secure the seed tube in place on the opener subframe. As the two portions are mated together, the rear of the seed tube rests against the base wall of the first mounting part, thereby further stabilizing the seed tube.

According to another aspect of the present invention, the mounting bracket extends between the seed tube and the opener subframe for securing the seed tube to the opener subframe with the seed tube being routed behind the axis of the opener disc. The bracket has a first mounting part attached to the opener subframe and a second mounting part fixed to the seed tube. The first mounting part has a channel structure for receiving the seed tube defined by first and second sidewalls extending from a base wall. The sidewalls have first and second slots, respectively, that open upwardly. The second mounting part has first and second portions that fit into the first and second slots, respectively. The first and second portions of the second mounting part mate with the first and second slots of the first mounting part, respectively, to secure the seed tube in place on the opener subframe with the mounting bracket surrounding the seed tube.

Numerous other objects and advantages of the present invention will be apparent to those skilled in this art from the following description wherein there is shown and described an embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings, all of which depict a right-hand opener for a no-till drill, along with components of the present invention in their right-hand form. In the drawings.

DETAILED DESCRIPTION OF THE INVENTION

An improved seed tube mounting assembly for agricultural seeders according to the present invention will now be described in detail by reference to FIGS. 1 to 5 of the accompanying drawings.

Figure 1:
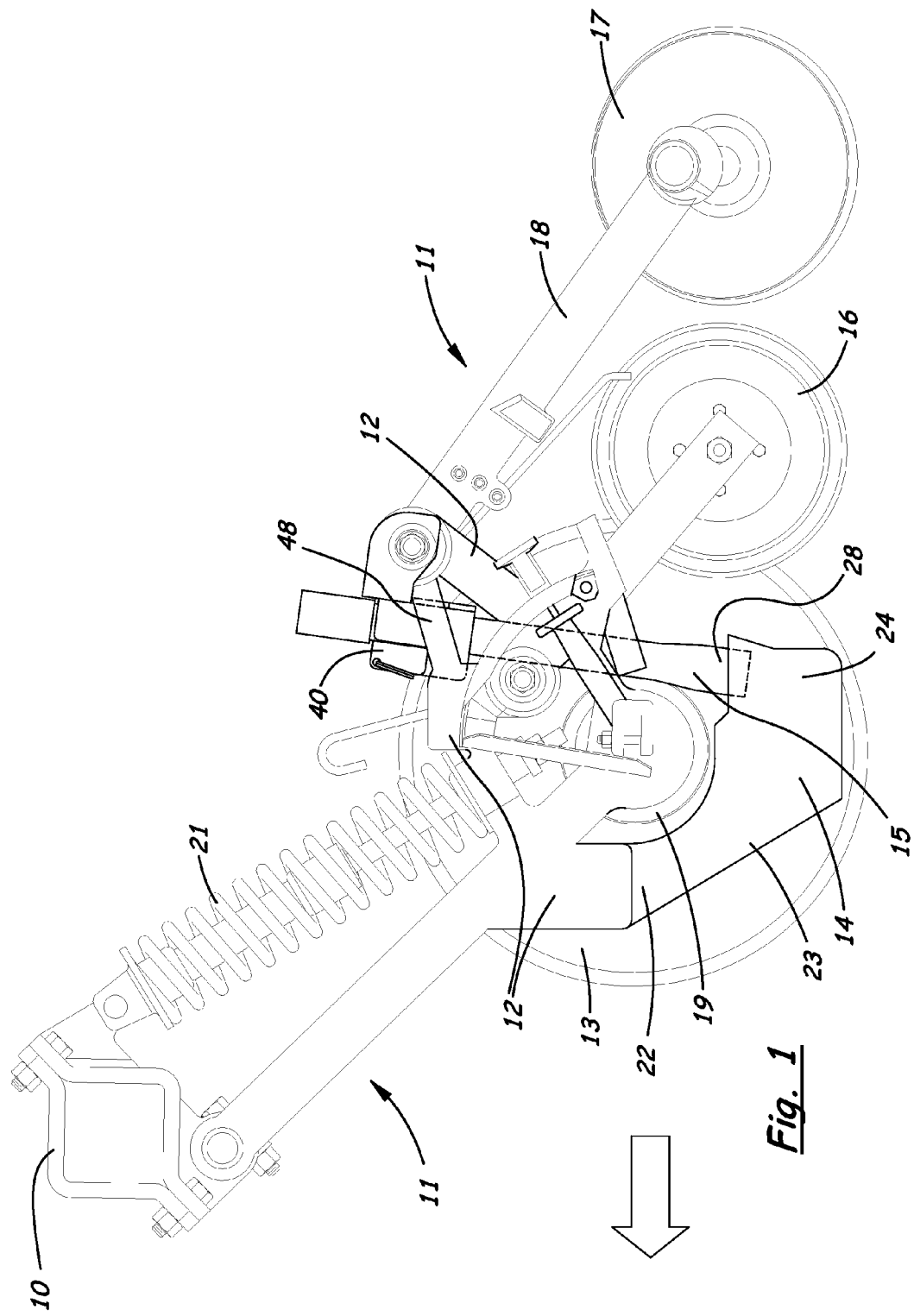
FIG. 1 is a side view of a row unit of an agricultural seeder having an opener assembly with a seed tube mounting system according to the present invention.

FIG. 1 is a side view of a no-till drill opener assembly 11 containing components for the functions of furrow-forming, seed directing, seed firming, and furrow closing. The opener assembly 11 includes, among other things, an opener subframe 12, an opener disc 13, a seed boot 14, a seed tube assembly 15, a firming wheel 16, a closing wheel 17, and a closing wheel arm 18. A plurality of such opener assemblies 11 are attached to a rockshaft 10 which is itself rotatably attached to a toolbar (not shown) for purposes of field operation in which the opener assemblies 11 are drawn along the soil for placing seeds therein. The depicted assembly 11 is a right-hand unit; the opposite side has minor-image units to equalize draft.

Figure 2:
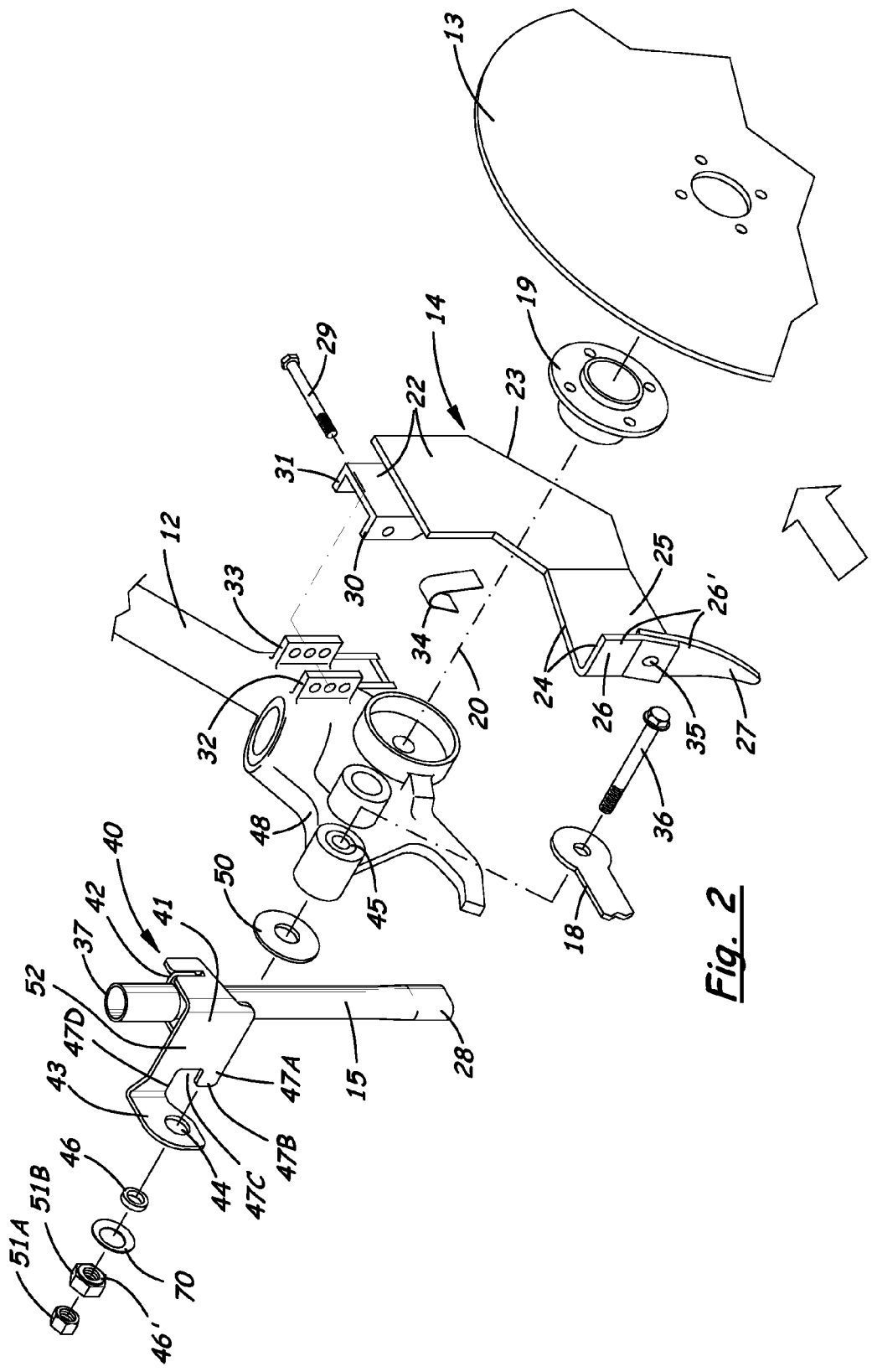
FIG. 2 is an exploded-perspective view of a portion of an opener assembly with the seed tube mounting system of the present invention as viewed from an elevated perspective rightwardly and rearwardly of the opener.
Figure 3:
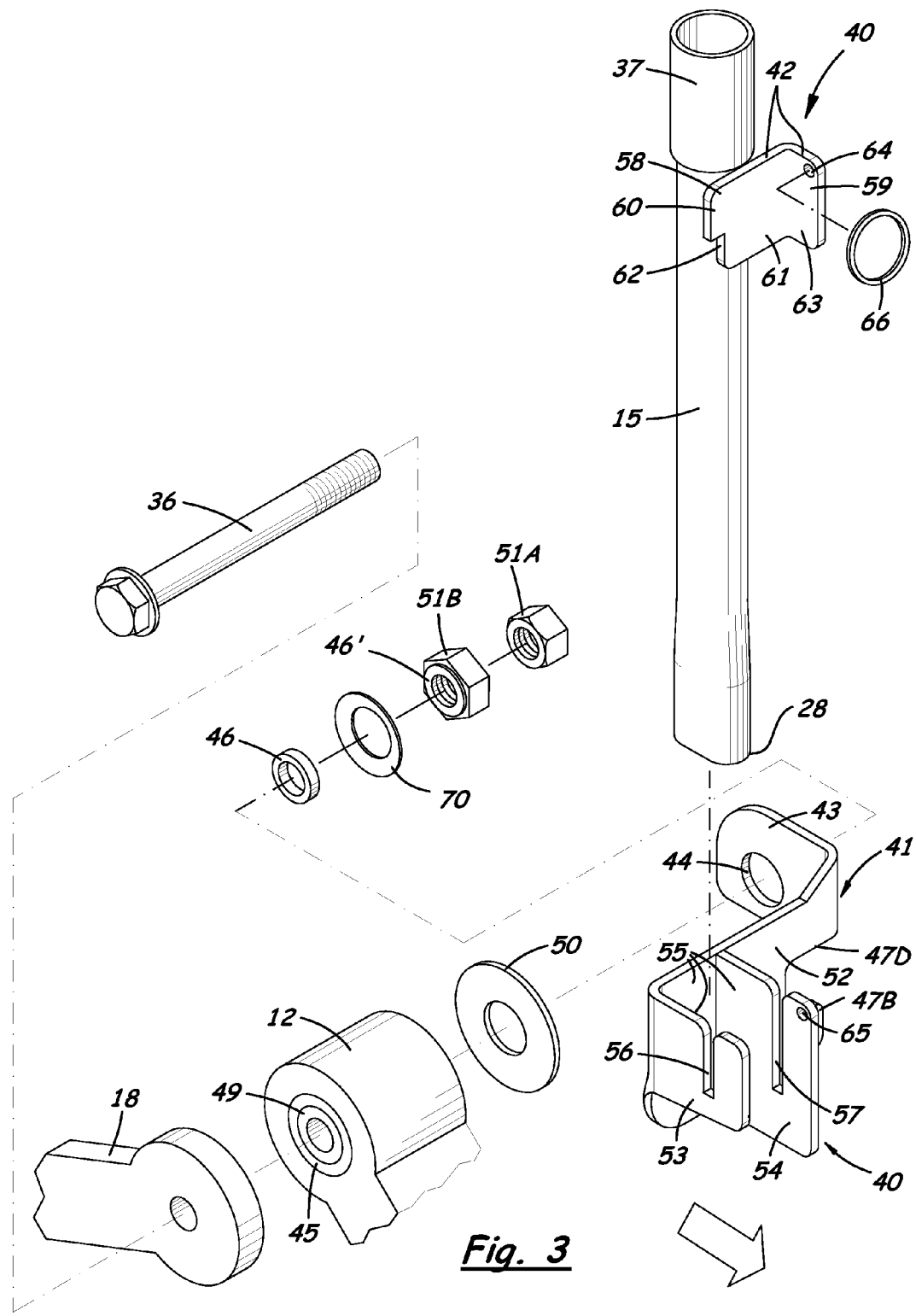
FIG. 3 is an exploded-perspective view of the seed tube mounting system of the present invention as viewed from an elevated perspective rightwardly and forwardly of the opener.
Figures 4, 5:
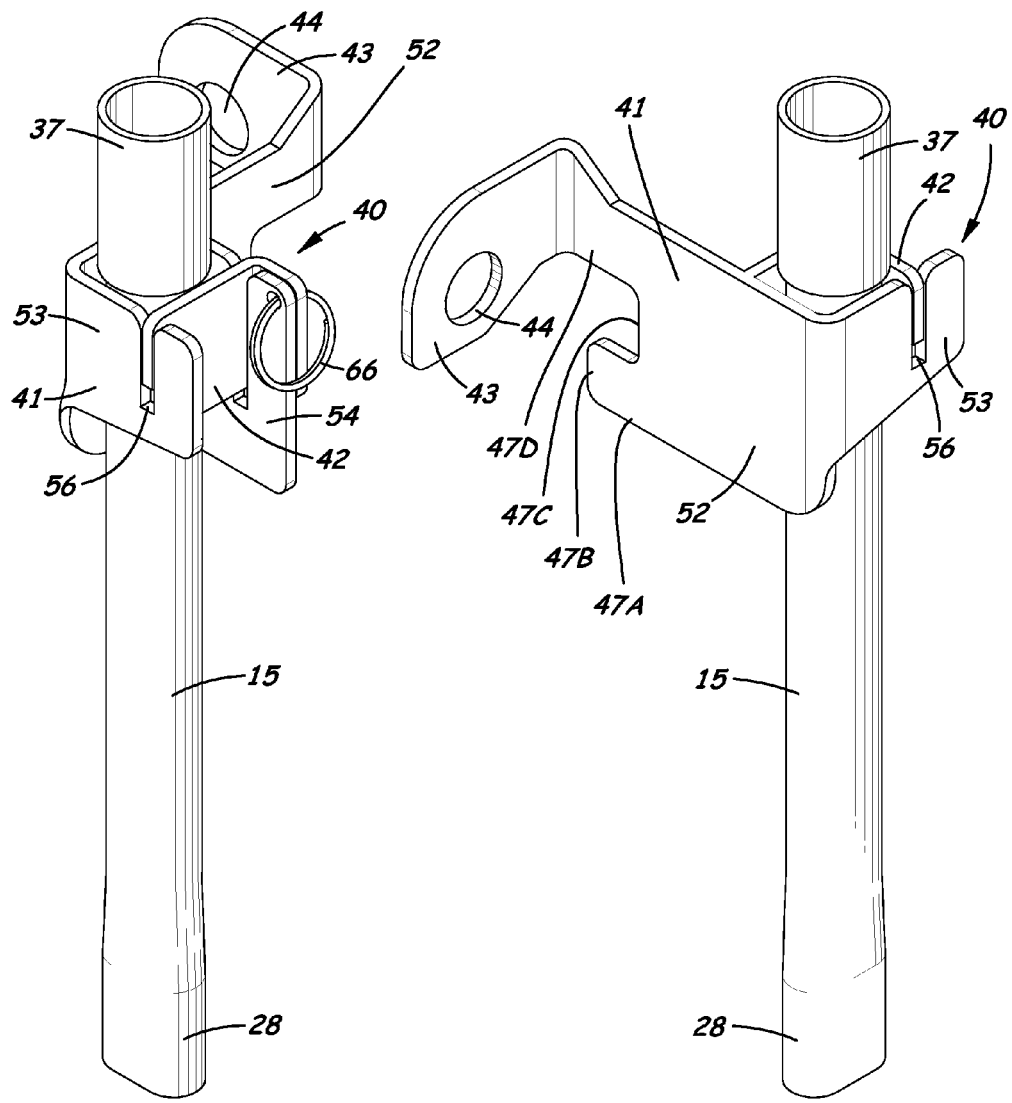
FIG. 4 is a perspective view of the seed tube mounting system as viewed from an elevated perspective at the front right-side of the seed tube.
FIG. 5 is another perspective view of the seed tube mounting system as viewed from an elevated perspective at the rear right-side of the seed tube.

The opener disc 13 of the opener assembly 11 is attached to the opener subframe 12 via a hub 19 that allows the opener disc 13 to rotate about an axis 20 (FIG. 2). While being pulled forward, pressure (down-force) is applied to the opener subframe 12 via a large coil spring 21, which causes the opener disc 13 to penetrate the soil with the penetration being limited by either the gauge wheel (not shown; primarily on the opposite side of opener disc 13) or the amount of down-force available. The opener subframe 12 causes the opener disc 13 to operate at a slight angle to the direction of travel, which causes soil at the rearward edge of the opener disc 13 to move towards the gauge-wheel side of the opener disc 13 and there-fore away from the boot 14 side of opener disc 13, thus creating an open furrow (not shown).

The seed boot 14 is arranged to guide the seeds into the lowermost portion of the furrow, and to hold and prevent loose soil adjacent to and/or comprising the side of the furrow from falling into the furrow in advance of the seed (not shown) being deposited in the furrow. The seed boot 14 has a first portion 22 (FIG. 2) for attaching the boot to the opener subframe 12 at a location above and forward of the hub 19 of the opener disc 13. A second portion 23 of the seed boot 14 comprises a forward edge that fits snugly against the opener disc 13 and functions as a scraper edge for contacting and scraping moist soil or mud from the side of the opener disc 13.

A third portion 24 of the seed boot 14 forms an enclosure between the boot 14 and the opener disc 13 for guiding seeds into position in the furrow created by the opener disc 13. The third portion 24 includes a primary wall 25 spaced apart laterally from the opener disc 13, and a rear wall 26' partially comprised of an end-cap 26 that extends between the primary wall 25 and the opener disc 13. The enclosure formed between the boot 14 and the opener disc 13 is below and predominantly rearward of the hub 19 of the opener disc 13. The rear wall 26' of the enclosure also comprises a flexible but resilient seed bounce flap 27 that extends downwardly from the end-cap 26. A lower edge of the boot 14 stays entirely within the cut furrow created by the opener disc 13 in the soil, i.e., the boot 14 is entirely within the "shadow" of the opener disc 13 during normal field operation when viewed from the front while traveling in a straight line. The upper-rearward portion of primary wall 25 and the end-cap 26 of the third portion 24 of the seed boot 14 are flared to accommodate the lower end 28 of the seed tube 15 without excessively constricting the width of the lower end 28 of the seed tube 15.

The boot 14 is held from its upper forward end by a single bolt 29 passing through holes in a pair of ears 30, 31 on the boot 14, which overlap corresponding ears 32, 33 with holes on the subframe 12. The boot 14 is secured by a locknut (not shown) threaded onto the bolt 29. A leaf spring 34 is contained by the ears 30-33, the bolt 29, and by ridges (not shown) along one side of the boot 14 and on the subframe 12 (immediately below the ears in both cases). The boot 14 can rotate a few degrees on the axis of the bolt 29, with the lower forward edge of the second portion 23 of the boot 14 being held against the opener disc 13 from the force exerted by the leaf spring 34.

The rearward portion of the boot 14 culminates in the end-cap 26, which extends from the primary wall 25 towards the opener disc 13 to create the enclosure for receiving the lower end 28 of the seed tube 15 and for guiding seeds into position in the furrow upon exiting the lower end 28 of the seed tube 15. The end-cap 26 includes a hole 35 for attaching the seed bounce flap 27 via a bolt (not shown) such that the flap 27 is oriented essentially vertically but allowed to bend rearward at its lower edge during field operation. Alternatively, flap 27 may be oriented up to ~45° from vertical, to reduce the amount of flexing required of flap 27, and to further resist mud accumulation in front of the flap 27.

The flap 27 is essentially perpendicular to the plane of the opener disc 13 with one lateral edge of the flap 27 abutting the opener disc 13, while the metal end-cap 26 has an edge that terminates just prior to contacting the opener disc 13. The upper-rearward portion of the boot 14 and the end-cap 26 are flared away from the opener disc 13 to accommodate the lower end 28 of the tube 15. The lower end 28 of the seed tube 15 is elliptical in cross-section, with a smaller dimension in a lateral direction than in a longitudinal direction, to occupy less lateral space in passing the constrictions among the opener assembly components, such as the firming wheel pivot bolt (not shown), as well as requiring less flaring of the primary wall 25 and the end-cap 26 of the boot 14. The remaining portion of the seed tube 15 above the lower end 28 can be circular or elliptical in cross-section.

The lower end 28 of the seed tube 15 extends into the enclosure created by the seed boot 14. An upper end 37 of the seed tube 15 is positioned to receive seeds from a metering mechanism (not shown) attached to the seed supply tank (not shown).

The seed tube 15 is secured to the opener subframe 12 by a two-part mounting bracket 40. The mounting bracket 40 includes a first mounting part 41 attached to the opener subframe 12 via the threaded bolt 36 used to attach the closing wheel arm 18 to the opener subframe 12. The mounting bracket 40 includes a second mounting part 42 fixed to the seed tube 15. The first and second mounting parts 41, 42 have portions that mate together with each other to removably secure the seed tube 15 to the opener subframe 12 in a manner that holds the seed tube 15 rigidly in place, thereby preventing the seed tube 15 from severely abrading against opener disc 13, and keeping the seed tube 15 properly positioned in relation to the seed boot 14 and the furrow. By using the threaded bolt 36 for the closing wheel arm 18 to attach the first mounting part 41, the first mounting part 41 can be easily retrofitted to an existing opener assembly without creating a new attachment point or otherwise modifying the opener assembly.

The first mounting part 41 includes a first flange 43 having a mounting opening 44 formed therein for receiving the threaded bolt 36 therethrough. The first mounting part 41 is secured to the opener subframe 12 by passing the threaded bolt 36 through the hole 44. The bolt 36 is slightly longer than the corresponding OEM bolt used to pivotally mount the closing wheel arm 18 to a socket 45 formed in the casting of the opener subframe 12. The seed tube 15 is attached to the opener subframe 12 independently of the boot 14 so that the boot 14 can move relative to the seed tube 15, and such that boot 14 maintains alignment and contact of forward edge 23 against opener disc 13.

The opening 44 in the flange 43 of the first mounting part 41 fits reasonably tightly (but with clearance) onto the bushing 46 on the bolt 36, and together with the axial thrust of the spring washer 70, creates a relatively rigid characteristic of the seed tube 15 and the mounting bracket 40 in relation to the opener subframe 12, so that the lower end 28 of the seed tube 15 is stabilized in position so as generally not to laterally contact either the opener disc 13 or the flared upper portion of primary wall 25 of the boot 14. The tube 15 is prevented from rotating rearward at its lower end 28 by a portion 47D (FIG. 2, 3, 4) of the first part 41 of the bracket 40 coming into contact with the upper side of area 48 (FIG. 1, 2) of the subframe 12, as well as portion 47A (FIGS. 2, 3, 4) of the first part 41 of the bracket 40 coming into contact with a different portion of the subframe 12 situated below area 48 and separated from it by a gap (FIG. 1).

Once the seed tube 15 is installed, the lower end 28 of the seed tube 15 can rotate forward only about 0.5 to 0.75-inch before contacting the hub 19. The seed tube 15 can be secured away from the hub 19 with a specially formed clasp (not shown) of spring steel, or similar means. Alternatively, the seed tube 15 may be allowed to rotate forward until contacting the hub 19, being allowed to rub against the hub 19 via a special wear pad (not shown) attached to the seed tube 15 in the appropriate location. As yet another alternative method, referring to the depicted embodiment, the first portion 41 of the bracket 40 has a thumb 47B protruding from a lower portion of the base wall 52. The thumb 47B creates a gap 47C between the thumb 47B and another lower edge 47D of the base wall 52 that extends from the flange 43. During assembly, the gap 47C fits over an area 48 of the subframe 12 (the area 48 is an elongated support member which is an integral part of the single cast piece comprising the subframe 12). As the first portion 41 is drawn into position by the bolt 36 and the special locknut 51B, the edge 47D and the thumb 47B become clamped over the upper and lower edges of area 48 of the subframe 12, thereby securing the seed tube 15 to resist fore/aft movement.

The closing arm 18 is pivotally connected to the opener subframe 12 by the bolt 36, which is inserted through a rotatable inner sleeve 49 (FIG. 3) in the socket 45 created by a housing feature of the subframe 12. The bolt 36 and inner sleeve 49 provide a pivot structure for allowing the closing arm 18 to rotatably move independently of the subframe 12. The bolt 36 also serves as the attachment point for the first part 41 of the bracket 40 for mounting the seed tube 15. The bolt 36 extends through the inner sleeve 49 in the housing of the opener subframe 12 and has the closing arm 18 attached on the outer side of the housing of the subframe 12, and the seed tube bracket 40 attached on the inner side of the housing. The OEM bolt that originally passed through the closing arm 18 and the tubular inner sleeve 49 is replaced with the bolt 36 which is approximately 0.5 inch longer.

During installation, the bolt 36 is inserted through the inner sleeve 49 which is then inserted into the socket 45 in subframe 12. The flat washer 50 is then installed over the protruding end of the bolt 36 and a narrow band of inner sleeve 49 protruding beyond socket 45 (the inner sleeve 49 is ~0.145-inch longer than the housing containing the socket 45). The inner sleeve 49 and bushing 46 fit snugly over the 0.625-inch diameter bolt 36. Inner sleeve 49 and bushing 46 both have an external diameter of ~1.0-inch. The flat washer 50 has an internal diameter slightly over 1.0 inch and has clearance over the external surface of inner sleeve 49. The first part 41 of the seed tube bracket 40 is then installed, along with bushing 46, with opening 44 going over the bushing 46. The opening 44 of the first mounting part 41 has clearance over the external surface (1.0-inch diameter) of the bushing 46. A spring washer 70 and a special locknut 51B are then installed onto the bolt 36 with the disc spring 70 oriented with its concave side towards the first part 41. The bushing area 46' (~1.0-inch diameter) of the special locknut 51B fits inside the opening in the disc spring 70, with the special locknut 51B being threaded appropriately to match the threads on the bolt 36. A secondary nut 51A is then installed over the bolt 36 and torqued against the special locknut 51B to prevent loosening during field operation.

The bushing 46 and the rotatable inner sleeve 49 (inside socket 45 of the opener subframe 12) together with the closing arm 18 are sandwiched on the bolt 36 between the special locknut 51B and the head of the bolt 36. As a result, when the special locknut 51B is drawn tight on the bolt 36, the bushing 46 and the inner sleeve 49 become integral with the closing arm 18 (the bolt 36 and special locknut 51B are also integrated). The clearance between the opening 44 in the flange 43 and the external surface of the bushing 46 allows the seed tube bracket 40 to remain stationary in relation to the opener subframe 12 while the closing wheel arm 18, bolt 36, sleeve 49, bushing 46, and locknuts 51B, 51A are allowed to rotate relative to the subframe 12. Slippage between the rotating parts occurs between the spring washer 70 and the bushing area 46' of the special locknut 51B, or between the spring washer 70 and the surface of the flange 43. With this mounting arrangement, the closing wheel 17 can follow undulations in the topography and cause oscillating rotation of the bolt 36 (together with sleeve 49, bushing 46, and locknuts 51B, 51A) as the closing arm 18 moves radially up and down, without causing the first part 41 of the seed tube bracket 40 or the seed tube 15 to move relative to the opener subframe 12. Flexing of the spring washer 70 also affords a small amount of lateral deflection of the lower end 28 of the seed tube 15 to occur, to accomodate for wear of components or for minor manufacturing imperfections. This can be important during field operation, since eventually the lower front edge of the second portion 23 of the boot 14 wears significantly due to abbrasion against the opener disc 13. As this wear continues, the leaf spring 34 will eventually cause the primary wall 25 of the boot 14 to push against the lower end 28 of the tube 15, and thus the flexing of spring washer 70 allows for the tube end 28 to be pushed against the disc 13 which thereby provides for some additional hours of operation before straw and soil plugging begins due to a gap occurring between the lower front edge of the second portion 23 of boot 14 and the disc 13.

The first mounting part 41 of the mounting bracket 40 includes a base wall 52 extending generally perpendicularly from the first flange 43, and first and second sidewalls 53, 54 extending generally perpendicularly from the base wall 52 at spaced locations from each other in a direction opposite from the first flange 43. The first flange 43, base wall 52, and first sidewall 53 together generally form an open Z-shape as viewed in plan view. The first and second sidewalls 53, 54 and the base wall 52 together form a channel structure 55 having an open front side for receiving the seed tube 15 therein.

The first sidewall 53 has a first slot 56 that extends generally vertically and is open at a top side. The second sidewall 54 has a second slot 57 that also extends generally vertically and is open at a top side. The second slot 57 is slightly longer than the first slot 56 to accommodate the shape and dimension of the second mounting part 42.

The second mounting part 42 is an L-shaped member having a first leg 58 and a second leg 59 that extends generally perpendicular to the first leg 58. The first and second legs 58, 59 each have a planar structure. The first leg 58 is attached to the seed tube 15 near the upper end 37 of the seed tube 15, for example, by welding to the outer surface of the seed tube 15. The planar structure of the first leg 58 extends generally tangentially of the seed tube 15 with portions of the planar structure extending beyond each side of the seed tube 15.

The first and second slots 56, 57 on the first mounting part 41 are arranged for receiving corresponding first and second portions 60, 61 of the first leg 58 of the second mounting part 42 when the two parts 41, 42 of the mounting bracket 40 are coupled together. The first and second portions 60, 61 of the second mounting part 42 fit into and mate with the first and second slots 56, 57, respectively. When the mounting parts 41, 42 are coupled, the channel structure 55 of the first mounting part 41 partially surrounds the seed tube 15 and operates together with the second mounting part 42 to create a rectangular box structure that completely surrounds the seed tube 15. The slotted connections between the first and second mounting parts 41, 42 create a rigid coupling for securing the seed tube 15 in place on the opener subframe 12 with the coupled parts 41, 42 of the mounting bracket 40 surrounding the seed tube 15. The slotted connections also reduce the amount of frictional contact between mating surfaces, thereby facilitating coupling and uncoupling of the seed tube 15 from the opener subframe 12. The external surface of the seed tube 15 contacts the internal surfaces of the box structure created by the first and second mounting parts 41, 42 at a plurality of distinct points about the circumference of the seed tube 15 when the two parts 41, 42 are coupled together. The plurality of distinct points creates stability for seed tube 15 while minimizing frictional contact between parts 41, 42 during coupling and uncoupling.

The second mounting part 42 has a third portion 62 that extends below the first portion 60 and engages the first sidewall 53 below the first slot 56. The third portion 62 is generally formed by creating a cutout area in the lower corner of the first leg 58 of the second mounting part 42. In the illustrated embodiment, the third portion 62 is the outer edge of the cutout area that faces and engages the first sidewall 53 within the channel structure 55 below the first slot 56.

The second mounting part 42 has a fourth portion 63 that engages the second sidewall 54 adjacent to the second slot 57. In the illustrated embodiment, the fourth portion 63 is the second leg 59 of the second mounting part 42, which extends generally perpendicular from the first leg 58. When the mounting parts 41, 42 are coupled together, the fourth portion 63 fits against a surface of the second sidewall 54 outside of the channel structure 55 and forwardly of the second slot 57.

A first pin opening 64 is provided in the second leg 59 of the second mounting part 42, and a corresponding second pin opening 65 is provided in the second sidewall 54 of the first mounting part 41. When the mounting parts 41, 42 are coupled, the pin openings 64, 65 of the second leg 59 and the second sidewall 54 are located to align to accommodate a key ring pinning mechanism 66. The key ring mechanism 66 includes an annular spring component that extends through the first and second openings 64, 65 for locking the first and second mounting parts 41, 42 together. The key ring mechanism 66 can be easily removed from the pin openings 64, 65 when it is desired to uncouple the first and second mounting parts 41, 42 from each other. Thus, the seed tube 15 can be easily and efficiently removed from the opener assembly 11 by simply removing the key ring mechanism 66 and lifting the seed tube 15 (together with the second part 42 of the mounting bracket 40) from the first part 41 of the mounting bracket 40.

While the invention has been specifically described in connection with specific embodiments thereof, it is to be understood that this is by way of illustration and not of limitation, and the scope of the appended claims should be construed as broadly as the prior art will permit.

What is claimed is:

1. An opener assembly for an agricultural seeder, comprising:
    an opener subframe;
    an opener disc attached to said opener subframe for rotation about an axis, said opener disc being arranged for forming a furrow in the ground;
    a seed tube arranged for guiding seeds into the furrow;
    a closing wheel arm connected to said opener subframe by a pivot structure comprising a threaded bolt;
    a mounting bracket for securing said seed tube to said opener subframe, said bracket comprising a first mounting part attached to said opener subframe via said threaded bolt and a second mounting part fixed to said seed tube; and
    said first and second mounting parts comprising portions that mate together with each other to removably secure said seed tube to said opener subframe.

2. The opener assembly according to claim 1, further comprising a pin structure that passes through respective openings in said first and second mounting parts to lock said parts together.

3. The opener assembly according to claim 1, wherein said first mounting part is attached to said opener subframe via said threaded bolt in a manner that allows the closing wheel arm to rotate relative to said opener subframe while the seed tube remains stationary relative to said opener subframe.

4. The opener assembly according to claim 3, further comprising a spring washer that fits over said threaded bolt and presses against said first mounting part of said bracket to reduce wobble of said seed tube.

5. The opener assembly according to claim 1, wherein said first mounting part comprises a first flange having a mounting opening formed therein for receiving said threaded bolt therethrough, a base wall extending generally perpendicular from said first flange, and first and second sidewalls extending generally perpendicularly from said base wall at spaced locations from each other and in a direction opposite from said first flange, said sidewalls and said base wall together forming a channel structure for receiving said seed tube.

6. The opener assembly according to claim 5, wherein said first and second sidewalls each have a slot for receiving a corresponding portion of said second mounting part.

7. The opener assembly according to claim 1, wherein said seed tube has an upper end and a lower end, and wherein said seed tube is positioned with said upper end rearward of said lower end so that the seed tube extends downwardly and forwardly from said upper end to said lower end behind said axis of said opener disc.

8. An opener assembly for an agricultural seeder, comprising:
    an opener subframe;
    an opener disc attached to said opener subframe for rotation about an axis, said opener disc being arranged for forming a furrow in the ground;
    a seed tube arranged for guiding seeds into the furrow;
    a mounting bracket for securing said seed tube to said opener subframe, said bracket comprising a first mounting part attached to said opener subframe and a second mounting part fixed to said seed tube;
    said first mounting part comprising first and second sidewalls extending from a base wall to form a channel having an open side for receiving said seed tube, and said sidewalls having first and second slots, respectively, that are open at their top sides; and
    said second mounting part comprising a first portion that fits into said first slot and a second portion that fits into said second slot, whereby said first and second portions of the second mounting part mate with said first and second slots, respectively, to secure said seed tube in place on said opener subframe.

9. The opener assembly according to claim 8, wherein said second mounting part further comprises a third portion that extends below said first portion and engages said first sidewall below said first slot, and a fourth portion that extends generally perpendicular to said second portion and engages said second sidewall adjacent to said second slot.

10. The opener assembly according to claim 9, wherein said second mounting part comprises an L-shaped member having a first leg comprising a planar structure attached to said seed tube and a second leg comprising a planar structure extending generally perpendicular to said first leg, said first leg comprising said first, second and third portions of said second mounting part, and said second leg comprising said fourth portion of said second mounting part.

11. The opener assembly according to claim 8, further comprising first and second pin openings formed in said first and second mounting parts, respectively, and a pinning mechanism extending through said openings for locking said first and second mounting parts together.

12. The opener assembly according to claim 11, wherein said first and second openings are located in said first and second mounting parts so as to align after said first and second mounting parts are coupled, and said pinning mechanism comprises a key ring having a spring component that extends through said first and second openings.

13. The opener assembly according to claim 8, further comprising a closing wheel arm connected to said opener subframe by a pivot structure, and wherein said first mounting part is attached to said pivot structure in a manner that allows the pivot structure to rotate relative to said opener subframe while the seed tube remains stationary relative to said opener subframe.

14. The opener assembly according to claim 13, wherein said pivot structure comprises a threaded bolt that extends through a bushing and socket in a housing in the opener subframe, and wherein said bracket is attached to said bolt by a structure that allows relative pivotal movement between said closing wheel arm and said bracket to isolate the bracket from movement of said closing wheel arm.

15. The opener assembly according to claim 14, further comprising a spring washer that fits over said threaded bolt and presses against said bracket to more perfectly align said first mounting part with said socket in the opener subframe along the axis of said threaded bolt, and to reduce wobble of the seed tube.

16. The opener assembly according to claim 8, wherein said seed tube has an upper end and a lower end, and wherein said seed tube is positioned with said upper end rearward of said lower end so that the seed tube extends downwardly and forwardly from said upper end to said lower end behind said axis of said opener disc.

17. An opener assembly for an agricultural seeder, comprising:
   an opener subframe;
   an opener disc attached to said opener subframe for rotation about an axis, said opener disc being arranged to operate at a slight angle to the direction of travel to create a furrow for depositing seeds;
   a boot for preventing loose soil adjacent the side of the furrow from falling into the furrow in advance of seed deposited therein;
   a seed tube having a lower end extending between said boot and said opener disc;
   a bracket extending between said seed tube and said opener subframe for securing said seed tube to said opener subframe with the seed tube extending behind said axis of said opener disc, said bracket comprising a first mounting part attached to said opener subframe and a second mounting part fixed to said seed tube;
   said first mounting part comprising a channel structure for receiving said seed tube, said channel structure comprising first and second sidewalls extending from a base wall, and said sidewalls having first and second slots, respectively, that open upwardly; and
   said second mounting part comprising first and second portions that fit into said first and second slots, respectively, whereby said first and second portions of said second mounting part mate with said first and second slots of said first mounting part, respectively, to secure said seed tube in place on said opener subframe with said mounting bracket surrounding said seed tube.

18. The opener assembly according to claim 17, wherein said seed tube extends downwardly and forwardly behind said axis of said opener disc.

19. The opener assembly according to claim 17, wherein said second mounting part comprises an L-shaped member having a first leg attached to said seed tube and a second leg extending generally perpendicular to said first leg away from said seed tube, said first leg comprising a planar structure attached to said seed tube and extending generally tangentially of said seed tube with portions of said planar structure on each side of said seed tube being arranged to couple with said first and second slots of said first mounting part, respectively.

20. The opener assembly according to claim 19, further comprising a pin structure that passes through respective openings in said second leg and said second sidewall to lock said first and second mounting parts together.

21. An opener assembly for an agricultural seeder, comprising:
   an opener subframe;
   an opener disc attached to said opener subframe for rotation about an axis, said opener disc being arranged for forming a furrow in the ground;
   a seed tube arranged for guiding seeds into the furrow, said seed tube having a circular or elliptical cross-section; and
   a mounting bracket for securing said seed tube to said opener subframe, said bracket comprising a first mounting part attached to said opener subframe and a second mounting part fixed to said seed tube;
   wherein said first and second mounting parts fit together to form a rectangular box structure surrounding said seed tube, with an external surface of said seed tube contacting internal surfaces of said box structure at a plurality of distinct points about a circumference of said tube;
   wherein said first mounting part comprises a U-shaped channel that forms three sides of said rectangular box structure; and
   wherein said second mounting part is rigidly fixed to an outer surface of said seed tube and forms a fourth side of said rectangular box structure only when said seed tube is placed into said U-shaped channel and said first and second mounting parts are mated together.

* * * * *